US009384397B2

(12) United States Patent
Vatsavai et al.

(10) Patent No.: US 9,384,397 B2
(45) Date of Patent: Jul. 5, 2016

(54) MODEL FOR MAPPING SETTLEMENTS

(71) Applicant: UT-Battelle, LLC, Oak Ridge, TN (US)

(72) Inventors: Ranga Raju Vatsavai, Oak Ridge, TN (US); Jordan B. Graesser, Oak Ridge, TN (US); Budhendra L. Bhaduri, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 247 days.

(21) Appl. No.: 13/973,573

(22) Filed: Aug. 22, 2013

(65) Prior Publication Data
US 2015/0055820 A1    Feb. 26, 2015

(51) Int. Cl.
G06K 9/00    (2006.01)
G06K 9/46    (2006.01)
G06K 9/62    (2006.01)

(52) U.S. Cl.
CPC .......... G06K 9/00637 (2013.01); G06K 9/4642 (2013.01); G06K 9/4676 (2013.01); G06K 9/6259 (2013.01)

(58) Field of Classification Search
CPC . G06K 9/6256; G06K 9/00637; G06T 7/0081
See application file for complete search history.

(56) References Cited

U.S. PATENT DOCUMENTS

| 6,380,934 | B1 * | 4/2002 | Freeman ............ G06K 9/00624 345/419 |
| 7,058,453 | B2 | 6/2006 | Nelson et al. |
| 7,743,975 | B2 | 6/2010 | Miller |
| 8,156,439 | B2 | 4/2012 | Booth |
| 8,282,001 | B2 | 10/2012 | Snyder et al. |
| 8,296,477 | B1 | 10/2012 | Polk |
| 8,774,470 | B1 * | 7/2014 | Schmidt ............... G06T 7/0081 382/113 |
| 2002/0128864 | A1 | 9/2002 | Maus et al. |
| 2005/0058338 | A1 * | 3/2005 | Krishnan ............. G06K 9/6807 382/159 |
| 2010/0014755 | A1 * | 1/2010 | Wilson ............... G06K 9/00604 382/173 |
| 2010/0020970 | A1 | 1/2010 | Liu et al. |
| 2011/0024490 | A1 | 2/2011 | Kangas et al. |
| 2012/0002865 | A1 * | 1/2012 | Malmberg .......... G06K 9/0063 382/154 |

(Continued)

FOREIGN PATENT DOCUMENTS

JP    2009-301481    12/2009

OTHER PUBLICATIONS

Michaela De Martino et al, Classification of Optical High Resolution Images in Urban Environment and Textural Information, Jul. 2003, Geoscience and Remote Sensing Symposium, Proceeding IEEE international (vol. 1) pp. 467-469.*

(Continued)

Primary Examiner — Gregory M Desire
(74) Attorney, Agent, or Firm — Brinks Gilson & Lione

(57) ABSTRACT

A programmable media includes a graphical processing unit in communication with a memory element. The graphical processing unit is configured to detect one or more settlement regions from a high resolution remote sensed image based on the execution of programming code. The graphical processing unit identifies one or more settlements through the execution of the programming code that executes a multi-instance learning algorithm that models portions of the high resolution remote sensed image. The identification is based on spectral bands transmitted by a satellite and on selected designations of the image patches.

10 Claims, 6 Drawing Sheets
(6 of 6 Drawing Sheet(s) Filed in Color)

(56) References Cited

U.S. PATENT DOCUMENTS

| | | |
|---|---|---|
| 2012/0116196 A1 | 5/2012 | Tubb |
| 2015/0016668 A1* | 1/2015 | Cheriyadat ........ G06K 9/00637 382/103 |
| 2015/0036874 A1* | 2/2015 | Gueguen ............. G06K 9/6219 382/103 |
| 2015/0055820 A1* | 2/2015 | Vatsavai ............ G06K 9/00637 382/103 |

OTHER PUBLICATIONS

Chen, Wenxi et al., "A Scalable Healthcare Integrated Platform (SHIP) and Key Technologies for Daily Application," Chapter 11, Data Mining in Medical and Biological Research, Eugenia Giannopoulou Ed., InTech, available from http://www.intechopen.com/, 2008, pp. 177-208.

\* cited by examiner

MODEL FOR MAPPING SETTLEMENTS

STATEMENT REGARDING FEDERALLY SPONSORED RESEARCH AND DEVELOPMENT

The invention was made with United States government support under Contract No. DE-AC05-00OR22725 awarded by the United States Department of Energy. The United States government has certain rights in the invention.

BACKGROUND

1. Technical Field

This disclosure relates to thematic classifications and more particularly to multi-instance learning systems that process high resolution spatial imagery.

2. Related Art

Land use is subject to rapid change. Change may occur because of urbanization, political conflicts, population displacements, and poverty. The unplanned, unauthorized, and/or unstructured homes, known as informal settlements, shantytowns, barrios, or slums, pose several challenges for nations. They may be located in hazardous regions and may lack basic services.

The use of satellite imagery has been ineffective in assessing change because the typical object size recorded in satellite imagery is much larger than the pixel resolution that renders the satellite imagery. A pixel by itself is not a good indicator of the objects it forms. Many per-pixel (single instance) based thematic classification schemes are good for analyzing medium and coarse resolution images. Thus, known learning approaches based on per-pixel spectral features are ineffective in high-resolution urban image classification.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

A modelling system processes windows or patches made up of a group of adjacent pixels that capture the spatial context of distinct entities like an object. The system includes a multi-instance learning algorithm that models portions of an image divided into multiple windows or image patches based on dimensions. Each window or image patch is modeled through a statistical distribution, like a Gaussian distribution. User designate training examples, programmed via one or more windows, and/or image patches for each classification form a bag of Gaussians (BoG) model based on parameters estimated through one or more estimation techniques that may include a maximum likelihood estimation process. When a BoG model is estimated, predictions are rendered by processing one or more adjacent windows or image patches such as through a "k" nearest neighbor (kNN) based process constructed on the ranked distances (or similarity) between a new or unprocessed Gaussian window (e.g., a query window) that is processed by the BoG model. Each modelling system has many applications including identifying permanent (e.g., formal settlements) or temporary communities (e.g., informal settlements), in which people live or have lived, without being limited to size or population levels. Settlements may range in size from a few dwellings to large urban cities. The multi-instance learning scheme executed by the modelling system models image patches (or portions bounded by windows) as a statistical distribution.

To model each bag of Gaussian as a distribution, parameters are estimated from the user programmed training data. When abstracting each window (or patch) as a Gaussian distribution, the model system is based on a bag of Gaussian of size "N," where "N" comprises a number of training bags. A bag representation is modelled instead of a set representation, to account for the possibility that two Gaussian distributions may be similar, if not nearly the same or identical. When a BoG model is generated from the training data, the modelling system may predict a class, such as a formal settlement or informal settlement, for example, for any image patch or window based on adjacent windows (or nearly adjacent windows). In operation the multi-instance learning scheme executes a BoG algorithm that automatically divides the image into grids (or patches) that may be based on the dimensions in an image; acquires and processes training data; matches a query bag (or query window) with the bag of Gaussians established by the training data; and classifies windows near neighborhoods based on the bags of Gaussians.

Figure 1:
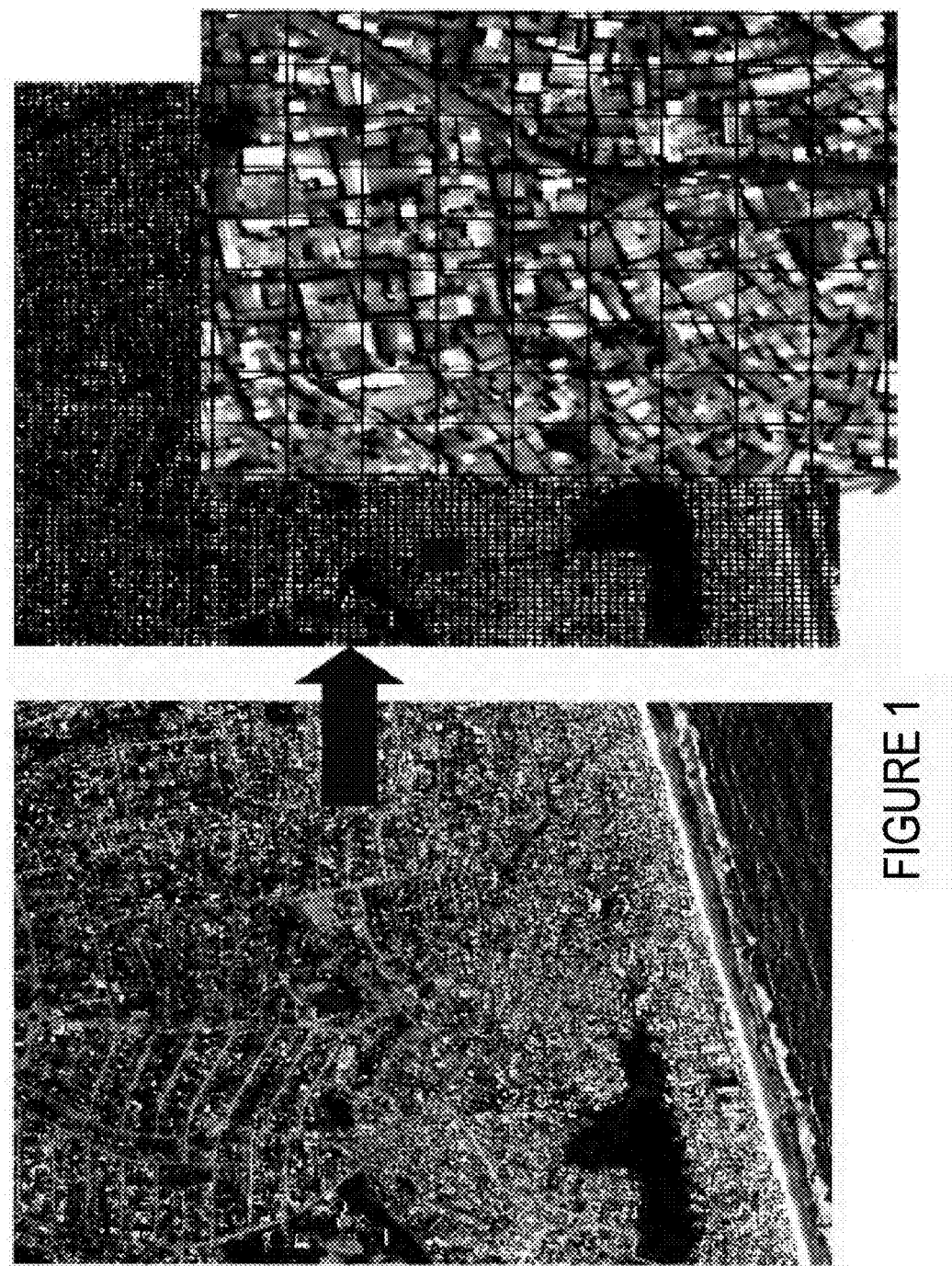
FIG. 1 is a high resolution image with user defined windows superimposed on it, and a magnified portion of the high resolution image shown within the user defined windows.

As shown in FIG. 1, the modelling system divides high resolution images such as satellite images into regular grids, or image blocks, or image patches. A grid may comprise a square, rectangular, or angular like block or a section in which its size (pixels per lines) determines the quality of the statistical algorithm (e.g., BoG algorithm). If the grid is too large, it may result in a poor classification. For example, large grids may include more than one object. If the grid size is too small it may increase the computational cost, and may also lead to errors in model parameter estimation. The preferred size is determined by the pixel resolution, typical object sizes found in the imagery, and the number of image bands (e.g., dimensions). FIG. 1 shows a computer generated grids superimposed on a high-resolution satellite image.

Figure 2:
FIG. 2 is a graphical user interface displaying the high resolution image divided into windows with colors representing each user's unique designated classification label programmed during a training session.

To train the modelling system a user or vision system may display the image with grids overlaid and select representative grid elements by selecting or programming the grid elements for each class (or thematic category). In some modelling systems, less than five percent of the grid elements are selected or programmed or designated. In other modelling systems less than one or two percent of the grid elements are selected or programmed or designated. Each colored grid represents a classification or designation as shown in FIG. 2, where the blue highlighted grid elements are designated water, the yellow highlighted grid elements are designated informal settlements, the red highlighted grid elements are designated formal settlements, and the green highlighted grid elements are designated trees. Each color or perceptible designation represents a unique class or category. And, in alternative and/or other dimensional features may be designated and applied via other colors and/or other perceptible elements such as those that may be identified through eyesight.

Figure 3:
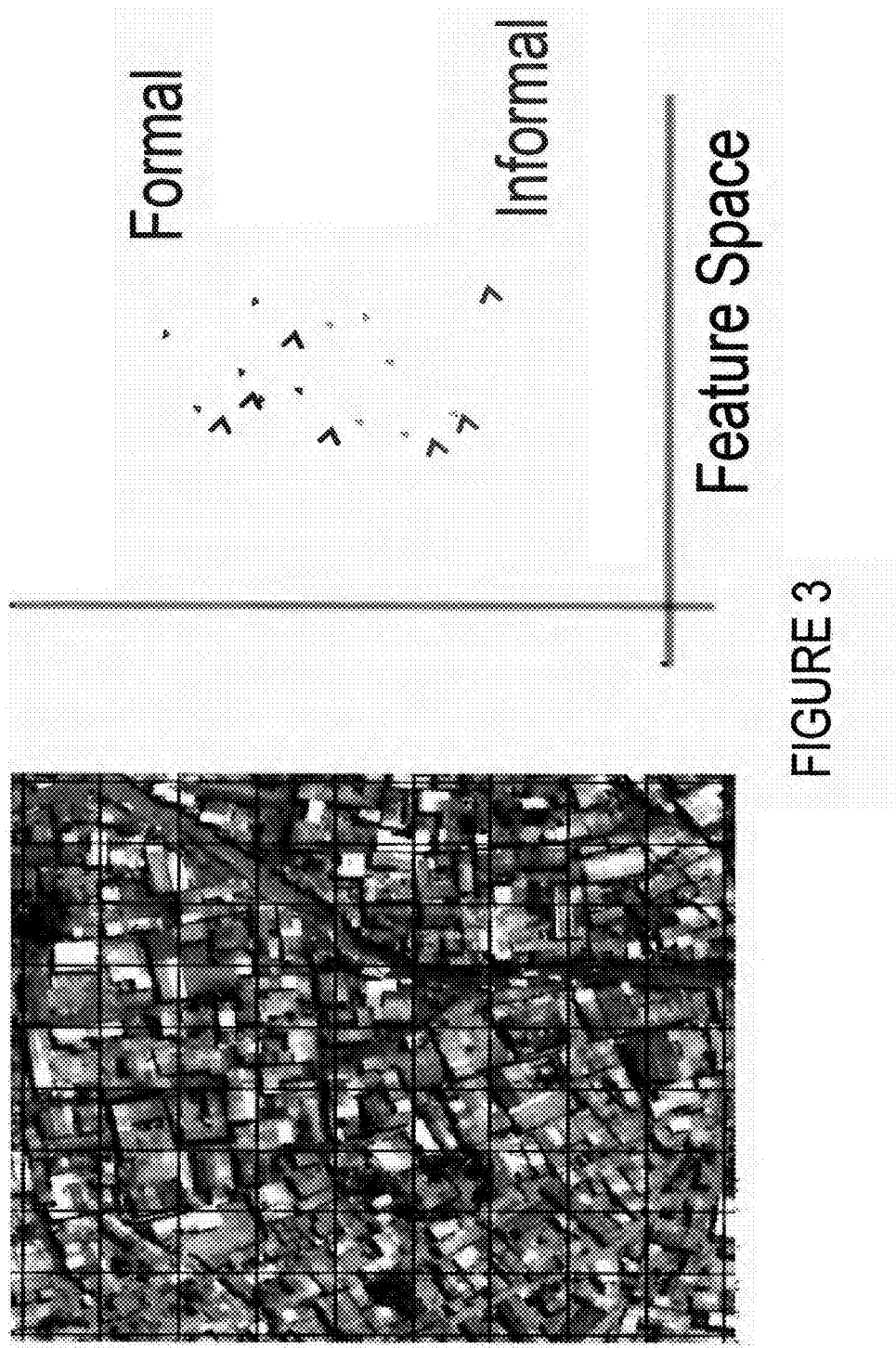
FIG. 3 is a graphical user interface displaying the user defined grid superimposed on the magnified high resolution image and a two dimensional image coordinate system illustrating a modeling of the samples in each window via a statistical distribution.
Figure 4:
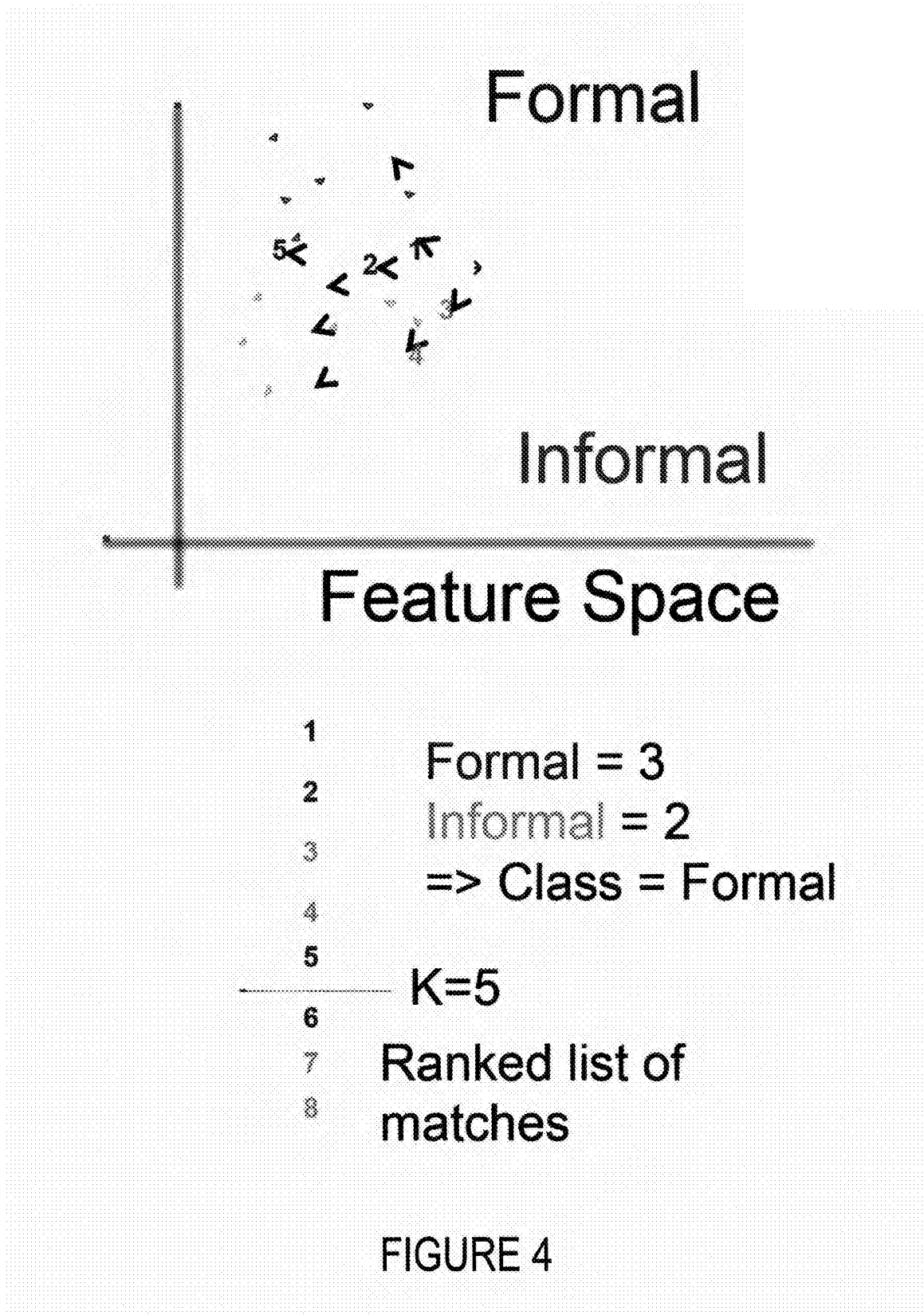
FIG. 4 represents the rank and distance used in an exemplary similarity score of FIG. 3.
Figure 5:
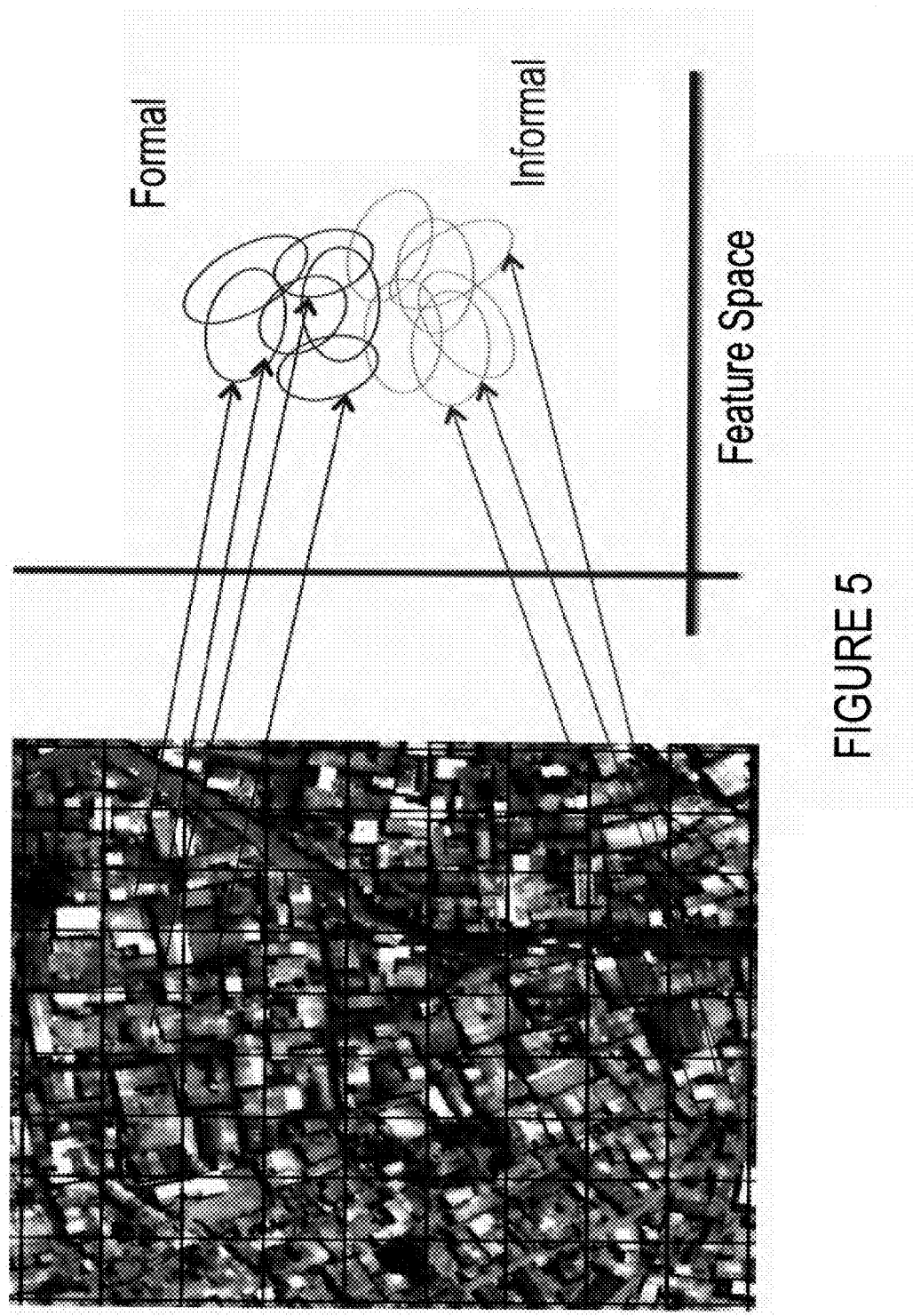
FIG. 5 displays the statistical model generated from the training data.
Figure 6:
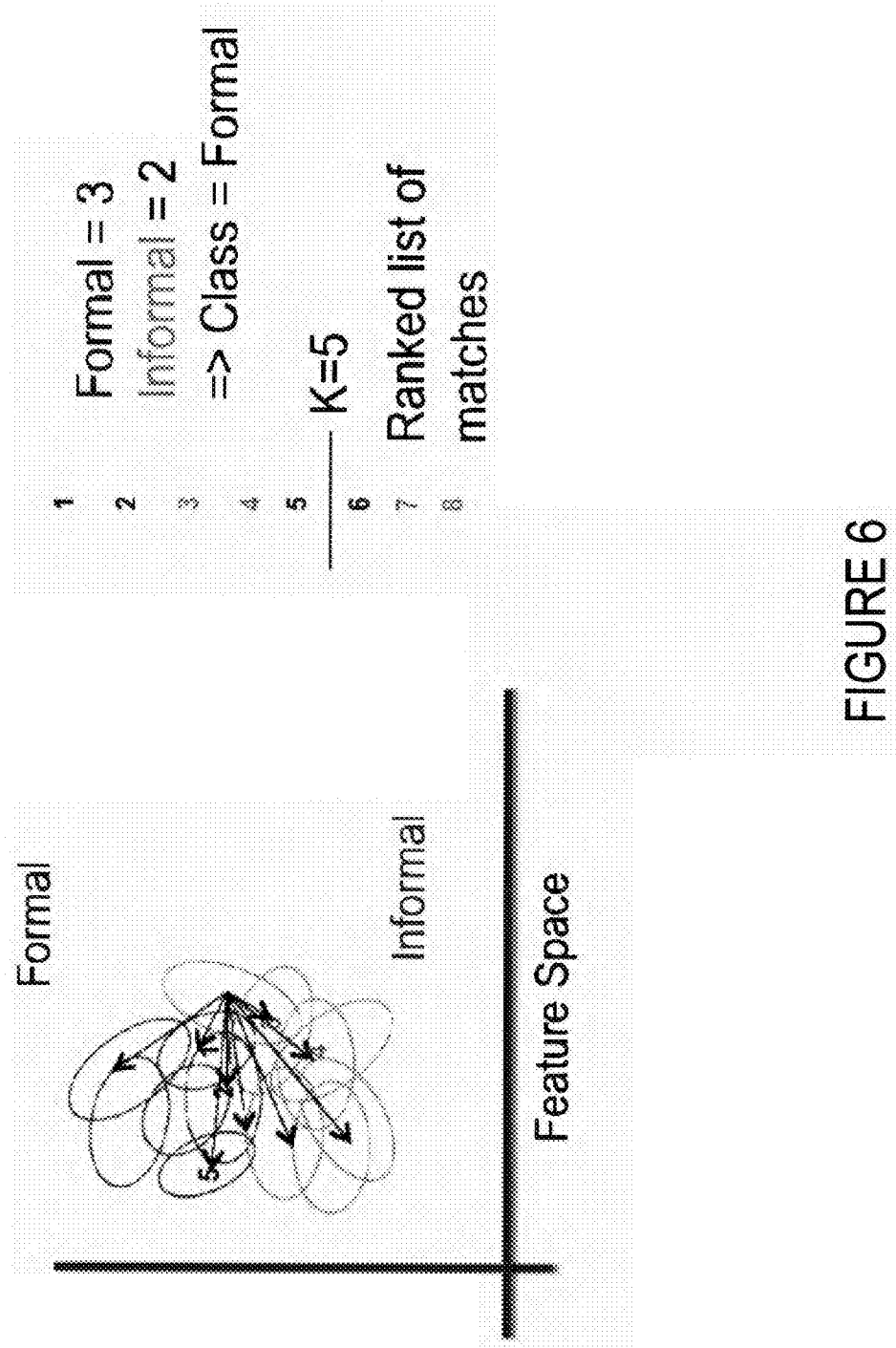
FIG. 6 represents the rank and distance used in an exemplary similarity score of FIG. 5.

Once one or more of the multi-dimensional feature are designated or classified, multi-dimensional feature vectors from each training pixel in the grid are generated by the modelling system through a multivariate Gaussian distribution:

$$p(x \mid y_j) = \frac{1}{\sqrt{(2\pi)^{-N}|\Sigma_j|}} e^{-\frac{1}{2}(x-\mu_j)^T |\Sigma_j|^{-1}(x-\mu_j)}$$

where the parameter mean is represented by $\mu$ and the covariance matrix is represented by $\Sigma$. The parameters may be estimated for each featured designated in the grid element separately from the corresponding image data to generate a statistical model like the BoG model. In FIGS. 3 and 4 the feature space for formal and informal settlements based on the training data are illustrated. The round surface of the earth captured by a satellite image are projected and represented on multiple two dimensional planes referenced by coordinate system (one of which is shown) illustrating the feature space. The number of planes is a function of the number spectral bands (e.g., 7, 8, 9, . . . 255) transmitted by the satellite rendering the image.

With the multi-instance learning algorithm programmed, the modelling system may predict the classification of other image windows and patches (e.g., the query window). In a BoG modeling systems, predictions may be based on the probabilistic distance between a given query window (Gaussian distribution, $P_i$) and each Gaussian ($Q_j$) established via the training windows or training image patches (e.g., the bag of Gaussians (BoG) models). For each new window or image patch (e.g., each query window), the modelling system computes the distance (or in alternative systems, the similarity) between the query window and each of the BoG models ($Q_j$). Based on the distance (or in alternative systems, the similarity) between the query window and each Gaussian ($Q_j$), the separation is ranked and the query window assigned a classification.

The modelling systems measures divergence and distance in many ways including the Bhattacharyya distance, the Mahalanobis distance, and/or the Kullback-Leibler (KL) divergence, for example. The KL divergence is a non-symmetric measure of the difference between two probability distributions P and Q, given by:

$$D_{KL}(P\|Q) = \int_{-\infty}^{\infty} p(x)\ln\frac{p(x)}{q(x)} dx$$

for Gaussian distributions, the KL divergence is expressed as:

$$D_{KL}(P\|Q) = \frac{1}{2}\left[\log\frac{|\sigma_Q|}{|\Sigma_P|} + Tr\left(\sum_Q^{-1}\sum_P\right) + (\mu_P - \mu_Q)^T \sum_Q^{-1}(\mu_P - \mu_Q)\right]$$

Although not a distance metric and not scaled between 0 and 1 (whereas Bhattacharyya and Mahalanobis are scaled), the symmetric version of KL divergence may be programmed as:

$$D_{KL}(P\|Q) = \frac{1}{2}(D_{KL}(P\|Q) + D_{KL}(Q\|P)$$

The modelling systems rank the distance (or rate by similarity score) and assign the query window (or patch) based on top the K nearest neighbor windows. A simplified prediction process is schematically and conceptually represented by FIGS. 3 and 4 and FIGS. 5 and 6. As shown in the figures, each new image patch is close to the "formal" class (3 votes) in comparison to the "informal" class (2 votes), and therefore it is assigned to the "formal" class.

To evaluate a BoG based modelling system, the system processed high spatial resolution images from five cities: Accra (001), Caracas (002), La Paz (003), Kabul (004), and Kandahar (005). Accra, the capital city of Ghana has a population of 4 million and it is estimated that one-third of its residents live in slums. In 2010, the population estimate for Caracas and La Paz was 3.098 million and 1.69 million, respectively. As of 2010, Kabul had a population estimate of 3.768 million whereas Kandahar had a 2006 estimate of 468, 200. The five cities represent diversity in terms of different climates, cultures, and economies. Caracas, Kabul, Kandahar, and La Paz reside in a tropical, dry, semi-arid, and subtropical highland climate, respectively. Caracas has an estimated 44% of its population living in in-formal settlements. The classification results are summarized in the following table:

| | Classification Results | | | | | |
|---|---|---|---|---|---|---|
| | cKNN | Regression | RF | MLP | NB | BoG Model |
| 001 | 70.25 | 71.25 | 72.08 | 69.58 | 75.66 | 95.66 |
| 002 | 82.96 | 78.15 | 81.85 | 81.81 | 74.07 | 85.00 |
| 003 | 80.97 | 77.17 | 78.26 | 80.23 | 76.08 | 83.25 |
| 004 | 79.78 | 64.89 | 69.14 | 73.93 | 60.10 | 81.20 |
| 005 | 81.69 | 77.18 | 80.58 | 81.14 | 74.55 | 87.17 |

As seen in the table above, a BoG modelling system performed consistently well when compared to other approaches. The modelling system's predictions are more computationally efficient than the second best process (Citation-KNN). Citation-KNN is computationally expensive and not timely. A single standard image required two days of computation time whereas the BoG modelling system required less than five minutes for the same image.

The methods, devices, systems, and logic described above may be implemented in many other ways in many different combinations of hardware, software or both hardware and software and may be used to compare, contrast, and visually rate many objects found in high resolution spatial images. All or parts of the system may be executed through one or more controllers, one or more microprocessors (CPUs), one or more signal processors (SPU), one or more graphics processors (GPUs), one or more application specific integrated circuit (ASIC), one or more programmable media or any and all combinations of such hardware. All or part of the logic described above may be implemented as instructions for execution by a microcontroller that comprises electronics including input/output interfaces, a microprocessor, and an up-dateable memory comprising at least a random access memory which is capable of being updated via an electronic medium and which is capable of storing updated information, processors (e.g., CPUs, SPUs, and/or GPUs), controller, an integrated circuit that includes a microcontroller on a single chip or other processing devices and may be displayed through a display driver in communication with a remote or local display, or stored and accessible from a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, includes a specifically programmed storage medium and computer readable instructions stored on that medium, which when executed, cause the device to perform the specially programmed operations according to the descriptions above.

The modeling systems may evaluate images shared and/or distributed among multiple users and system components, such as among multiple processors and memories (e.g., non-transient media), including multiple distributed processing systems. Parameters, databases, comparison software, pre-generated models and data structures used to evaluate and analyze or pre-process the high resolution images may be separately stored and executed by the processors. It may be incorporated into a single memory block or database, may be logically and/or physically organized in many different ways, and may be implemented in many ways. The programming executed by the modeling systems may be parts (e.g., subroutines) of a single program, separate programs, application program or programs distributed across several memories and processor cores and/or processing nodes, or implemented in many different ways, such as in a library or a shared library accessed through a client server architecture across a private network or publicly accessible network like the Internet. The library may store detection and classification model software code that performs any of the system processing and classifications described herein. While various embodiments have been described, it will be apparent to those of ordinary skill in the art that many more embodiments and implementations are possible.

The term "coupled" disclosed in this description may encompass both direct and indirect coupling. Thus, first and second parts are said to be coupled together when they directly contact one another, as well as when the first part couples to an intermediate part which couples either directly or via one or more additional intermediate parts to the second part. The term "substantially" or "about" may encompass a range that is largely, but not necessarily wholly, that which is specified. It encompasses all but a significant amount. When devices are responsive to commands events, and/or requests, the actions and/or steps of the devices, such as the operations that devices are performing, necessarily occur as a direct or indirect result of the preceding commands, events, actions, and/or requests. In other words, the operations occur as a result of the preceding operations. A device that is responsive to another requires more than an action (i.e., the device's response to) merely follow another action.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method of analyzing high resolution remote sensing imagery, comprising:
   an integrated circuit that includes a microcontroller on a single chip executes the functions comprising:
   receiving satellite imagery data;
   automatically dividing the high resolution imagery into image patches;
   acquiring and automatically processing training data that renders bag of Gaussian models;
   processing a query window comprising a portion of the imagery data with the bag of Gaussian models to classify objects recorded in the satellite imagery data.

2. The method of claim 1 where the act of dividing the high resolution imagery is based on the pixel resolution of satellite imagery.

3. The method of claim 1 where the act of dividing the high resolution imagery is based on the average size of objects recorded in the satellite imagery data.

4. The method of claim 1 where the act of dividing the high resolution imagery is based on the number of image bands transmitted by a satellite.

5. The method of claim 1 further comprising designating selected image patches into discriminate classes.

6. The method of claim 5 where the act of designating comprises color coding the selected image patches.

7. The method of claim 1 further comprising generating multi-dimensional feature vectors for each training data rendering a training pixel in a training patch.

8. The method of claim 1 further comprising generating a plurality of two-dimensional planes based on the number of spectral bands transmitted by a satellite.

9. The method of claim 1 where the classification is based on a probabilistic distance between the query window with the bag of Gaussian models.

10. The method of claim 9 where the classification is based on a ranking.

* * * * *